ately at least 1 kHz and of an amplitude of 1 to 50 microns ($\mu$m), preferably of at most 5 $\mu$m are applied to

United States Patent [19]
Inoue

[11] 4,358,655
[45] Nov. 9, 1982

[54] METHOD AND APPARATUS FOR ELECTROEROSION MACHINING WITH A VIBRATING WIRE ELECTRODE

[75] Inventor: Kiyoshi Inoue, Tokyo, Japan

[73] Assignee: Inoue-Japax Research Incorporated, Yokohama, Japan

[21] Appl. No.: 121,662

[22] Filed: Feb. 15, 1980

Related U.S. Application Data

[60] Continuation-in-part of Ser. No. 60,346, Jul. 25, 1979, which is a division of Ser. No. 796,369, May 12, 1977, Pat. No. 4,205,213.

[30] Foreign Application Priority Data

Jun. 11, 1979 [JP] Japan ................................. 54-73289
Nov. 13, 1979 [JP] Japan ............................... 54-147238

[51] Int. Cl.³ .............................................. B23P 1/12
[52] U.S. Cl. ............................. 219/69 M; 219/69 W
[58] Field of Search ......................... 219/69 W, 69 M

[56] References Cited

U.S. PATENT DOCUMENTS

| 2,794,110 | 5/1957 | Griffith | 219/69 W |
| 3,830,996 | 8/1974 | Ullmann et al. | 219/69 W |

FOREIGN PATENT DOCUMENTS

| 1457965 | 12/1976 | United Kingdom | 219/69 W |
| 507427 | 4/1976 | U.S.S.R. | 219/69 W |

Primary Examiner—C. C. Shaw
Attorney, Agent, or Firm—Karl F. Ross

[57] ABSTRACT

An electroerosion machining method and apparatus with a continuous, traveling-wire electrode in which vibrations of frequencies not lower than 100 Hz, preferably at least 1 kHz and of an amplitude of 1 to 50 microns ($\mu$m), preferably of at most 5 $\mu$m are applied to the traveling wire electrode at opposite sides with respect to the machining region of an electrically conductive workpiece. The method may be used advantageously in reforming a workpiece contour previously shaped by a traveling-wire rough-EDM operation. A resonant circuit connected in series or in parallel with the machining gap and optionally coupled with an external oscillator may be used to energize electromechanical transducers forming vibrator means.

21 Claims, 8 Drawing Figures

METHOD AND APPARATUS FOR ELECTROEROSION MACHINING WITH A VIBRATING WIRE ELECTRODE

CROSS-REFERENCE TO RELATED APPLICATIONS

This application is a continuation-in-part application of my copending U.S. application Ser. No. 60,346 filed July 25, 1979 as a division of Ser. No. 796,369 filed May 12, 1977, U.S. Pat. No. 4,205,213 issued May 27, 1980.

FIELD OF THE INVENTION

The present invention relates to electroerosion machining and, more particularly, to an electroerosion method and apparatus machining an electrically conductive workpiece with a continuous traveling wire constituting an electroerosion electrode.

BACKGROUND OF THE INVENTION

In electrical machining of this type, which is also commonly called "wire-cut EDM" or "traveling-wire EDM", the wire electrode is continuously advanced from a supply side to a takeup side through a machining zone in which the workpiece is positioned and to which a machining liquid, typically distilled water or a liquid dielectric, is supplied. The workpiece is juxtaposed with the axially traveling wire across the machining zone between a pair of guide members which serve to stretch the traveling wire and to position it precisely in a predetermined machining relationship with the workpiece. A series of electrical pulses are applied across a machining gap formed between the workpiece and the traveling electrode to effect time-spaced electrical discharges thereat to electroerosively remove material from the workpiece. As material removal proceeds, the workpiece is displaced relatively and transversely to the continuously traveling wire electrode, typically under numerical control, along a predetermined path to generate a desired pattern of cut in the workpiece. The continuous advancement or travel of the wire is effected typically by traction drive rollers disposed at a location between the guide member on the downstream side and the wire take-up means. A desired tension is established in the traveling wire typically by providing brake rollers at a location between the guide member on the upstream side and the wire supply means.

As described in the aforementioned copending applications, the achievement of a satisfactory machining accuracy requires the use of a wire electrode as thin as 0.05 to 0.5 mm in diameter. This requirement has heretofore imposed restrictions in machining performance. Such a thin wire, given a desired tension, tends to be broken when arcing or short-circuiting with the workpiece takes place occasionally. Thus, the machining efficiency or removal rate hitherto achievable has been limited to an unsatisfactory level since wire breakage is unavoidable when an enhancement of machining efficiency or an increase in the rate of relative displacement is attempted.

PRIOR DISCLOSURE

In the aforementioned copending applications, I have disclosed an improved wire-cut or traveling-wire EDM or electroerosion method and apparatus wherein a vibration is imparted to the traveling wire electrode in the region of the machining gap and in a direction transverse to the axis of the traveling wire electrode, the vibration being of a frequency not lower than 100 Hz.

It has been found that by imparting such a vibration to the traveling wire electrode, it is possible to practically eliminate the breakage of the wire electrode and to permit steady machining to proceed thereby enabling the removal rate and machining efficiency to be markedly enhanced.

The frequency of the vibration is preferably in a range between 1 and 50 kHz and the amplitude is preferably in a range between 1 and 5 microns ($\mu$m) but may be as large as or slightly smaller than the size of the machining gap, say 50 microns ($\mu$m).

The vibration is imparted to the wire electrode in a direction transverse to the axis of the traveling wire electrode so that an undulating oscillatory motion with more than two nodes and antinodes or loops is provided in the wire traveling between the two guide members positioned at opposite sides with respect to the workpiece.

By imparting such a vibration or undulating oscillatory motion to the wire electrode stretched and axially travelling between a pair of wire guide members, it appears that a pumping action is generated in the machining zone to facilitate removal or carrying-away therefrom of machined products, i.e. chips and gases and, of even greater importance, a dispersive production of successive discharges in the machining zone over the entire workpiece thickness is assured, thus avoiding a concentration of the discharges on a single point or region of the wire electrode traveling through the workpiece. It is also conceivable, though possibly less important, that the contact resistance on the guide members and other contact portions with the wire electrode is substantially reduced.

Means for imparting the vibration to the traveling wire electrode is preferably in contact with a wire guide member for the electrode and may be an electromagnetic or a sonic or ultrasonic vibrator. The vibrator means may include a magnetostrictive or piezoelectric vibrator.

A control system is preferably provided, in operation of the apparatus, to respond to the machining state in the gap and to cause a parameter of the vibration to be modified in response to that state. The vibrator means are preferably arranged to be cooled by a coolant fluid.

In the use of the apparatus, the machining liquid is advantageously supplied to the wire by flowing through the location where the vibrating end of the vibrator arrangement comes in contact with the wire so that the heat generated at the vibrating body is sufficiently dissipated to avoid a detrimental heating of the wire electrode.

It is also preferable to keep the plane of the wire vibration coincident with the direction of the relative displacement of the workpiece to the traveling wire electrode.

OBJECTS OF THE INVENTION

It is an object of the present invention to extend the principles set forth in the aforementioned copending applications.

Another object of the invention is to provide a method of and an apparatus for electroerosion of the traveling-wire type set forth above, which constitute improvements over those disclosed in the aforementioned copending applications and which afford an increased removal rate and machining efficiency.

A concomitant object of the invention is to provide an improved electroerosion method and apparatus of the traveling-wire type set forth above, applicable to workpieces of a greater thickness with an excellent machining efficiency, removal rate and machining stability.

A further object of the present invention is to provide an electroerosion method and apparatus of the traveling-wire type which is highly useful for reforming or finishing an electroerosion machined workpiece surface which is previously formed by a traveling-wire or other electroerosion operation.

SUMMARY OF THE INVENTION

In accordance with the present invention, in a first aspect thereof, there is provided a method of electroerosion-machining of an electrically conductive workpiece with a continuously axially traveling wire electrode traversing the workpiece, wherein; the traveling wire electrode and the workpiece are relatively displaced transversely to the direction of travel of the wire electrode and define a machining gap therebetween; a series of electrical pulses are applied across the workpiece and the electrode to produce machining discharges in the gap to remove material from the workpiece; and a vibration is imparted to the traveling wire electrode at a pair of locations on one side and the other of the workpiece, respectively, said vibrations in the two locations being each in a direction transverse to the axis of the traveling wire electrode and of a frequency not lower than 100 Hz and preferably of different frequencies.

The vibrations are imparted at two locations opposed with respect to the workpiece to the wire electrode each in a direction transverse to the axis of the traveling wire electrode so that they are superimposed upon one another to create a composite undulating oscillatory motion with more than two nodes and antinodes or loops in the wire traveling between the two guide members positioned at opposite sides with respect to the workpiece and each outside of location at which the vibration is applied.

By imparting a vibration to the traveling wire electrode at both sides of the workpiece through which it is passed in a traveling-wire electroerosion system, it has now been found, surprisingly, that a further much enhanced improvement in the removal rate is attained, this being especially noticeable when workpieces of a greater thickness, say, more than 10 mm are machined. Thus, a much intensified pumping action appears to be generated in the machining zone to facilitate removal or carrying-away therefrom of machining products, i.e. chips and gases and, of even more importance, a highly effective dispersive production of successive discharges in the machining zone over the entire workpiece thickness is assured, thus more favorably restraining the discharges from being concentrated on a single point or region of the wire electrode traveling through the workpiece.

The vibrations imparted at the two opposed locations with respect to the workpiece are preferably of different frequencies such that a beat or periodic variation in amplitude of a wave that is the superposition of the corresponding two simple harmonic waves of the different frequencies is produced in the traveling wire electrode. This arrangement has been found to be very advantageous in that it facilitates and enhances the removal of machining chips and other gap products while suppressing the temperature rise of the workpiece.

In accordance with the present invention, in a second aspect thereof, an electroerosion machining apparatus of the class having a wire electrode which is arranged to travel continuously axially through a machining zone of a conductive workpiece, for performing a method according to the aforementioned first aspect, comprises: a pair of vibrator means disposed at locations on one side and the other of the workpiece, respectively, for imparting vibrations of a frequency (and preferably different frequencies) in the range not lower than 100 Hz to the wire electrode and each in a direction transverse to the axis of the wire electrode; displacement means for causing the relative transverse displacement of the wire electrode and the workpiece; means for applying the electrical pulses across the workpiece and the electrode; and means for supplying the machining liquid to the gap.

The two vibration means are preferably positioned at their respective locations so as to provide the respective vibrations in directions transverse to each other, viz., for example, one in the direction of x-axis and the other in the direction of y-axis, i.e. the axes along which the workpiece is displaced relative to the traveling wire electrode by the aforementioned displacement means, e.g. a numerically controlled drive means.

Each of the vibrator means is preferably in contact with a wire guide member for the electrode and may be an electromagnetic or a sonic or ultrasonic vibrator. Each vibrator means can include a magnetostrictive or piezoelectric vibrator. In accordance with a further feature of the invention, the vibrators may be connected for energization with respective resonant circuits each connected across the machining gap.

A control system is preferably provided, in operation of the apparatus, to respond to the machining state in the gap and to cause a parameter of the vibrations to be modified in response to the gap state. The vibrator means are preferably arranged to be cooled by a coolant fluid.

In the use of the apparatus, the machining liquid is advantageously supplied to the wire by causing it to flow through the location where the vibrator end of each vibrator arrangement comes in contact with the wire or by causing it to flow in contact with the body of each vibrator so that the heat generated at the vibrating body is sufficiently dissipated to avoid a detrimental heating of the wire electrode.

It is also sometimes desirable to keep the plane of the wire vibration coincident with the direction of the relative displacement of the workpiece to the traveling wire electrode.

BRIEF DESCRIPTION OF THE DRAWING

These and other objects, features and advantages of the invention will become more readily apparent from the following description of embodiments thereof made with reference to the accompanying drawing being given by way of example only, and in which.

SPECIFIC DESCRIPTION

Figure 1:
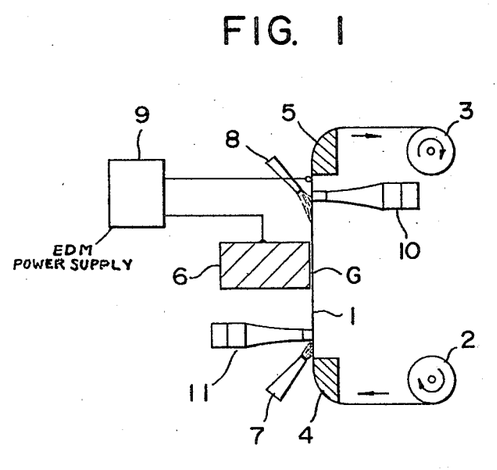
FIG. 1 is a schematic view, essentially in section, diagrammatically illustrating an apparatus embodying the present invention.

From FIG. 1 it can be seen that wire electrode 1 is fed from a supply reel 2 and wound on a takeup reel 3 while being supported and guided by a pair of support and guide members 4 and 5. The axial displacement of the wire electrode 1 is effected by means of a traction motor drive arrangement (not shown) provided downstream of the guide member 5 with a suitable brake mechanism (not shown) being provided upstream of the guide member 4 to cause the wire 1 to travel under a controlled tension between the members 4 and 5 and through a machining gap G formed between the wire electrode 1 and a workpiece 6 juxtaposed therewith. A pair of nozzles 7 and 8 are provided for supplying a machining liquid to the machining gap G, across which a succession of electrical pulses are applied from an EDM power supply 9 to effect successive machining discharges between the wire electrode 1 and the workpiece 6.

The workpiece 6 is secured on a worktable (not shown) and a relative displacement is effected between the worktable and the wire electrode along x and y axes in a programmed path.

In contact with or in close proximity to the traveling wire electrode 1, there are provided, in accordance with the present invention, vibrators 10 and 11 at opposite sides with respect to the workpiece 6. The two vibrators, as seen from FIG. 2 (in which the workpiece located between them is omitted), are preferably oriented in the mutually transverse directions, say, one in the direction of an x-axis and the other in the direction of a y-axis of the relative displacement of the workpiece 6 to the traveling wire electrode 1. The vibrators 10 and 11 are energized by high-frequency power supply means (not shown) of a frequency and, preferably different frequencies, not lower than 100 Hz to impart vibrations to the wire electrode 1 traveling between the support and guide members 4 and 5 under tension. Thus, if an arc discharge or short-circuiting takes place in the machining gap, it can be extinguished mechanically by the high-frequency vibrations of the wire electrode 1. Contact and contact friction over the guide members 4 and 5 is also markedly reduced. Furthermore, the removal of machining products and gases produced in the machining gap which tend to disturb the machining stability is facilitated by the double wire vibrations, with the result that steady machining is continued with stability, without breakage of the wire electrode and with an increased removal rate.

Figure 2:
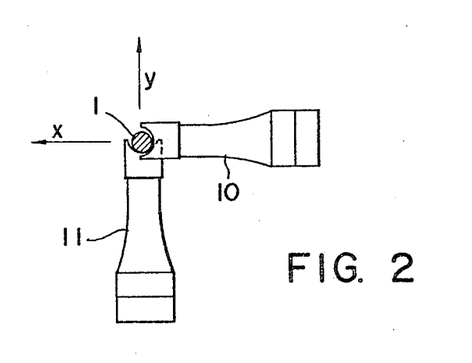
FIG. 2 is a schematic plan view of a portion of the apparatus of FIG. 1.

Each of the vibrations at the two locations is effected at an amplitude in the range between 1 and 50 microns, preferably between 1 and 5 microns and at a frequency not less than 100 Hz, preferably in the range between 1 and 50 kHz.

A vibration of wires, as generally shown by the equation:

$$F = \frac{n}{2L} \sqrt{\frac{Pg}{\gamma}}$$

where F: the frequency, n: the node number, L: the distance between supporting points, P: the tension, g: the gravitational acceleration, and $\gamma$: the weight of unit mass, occurrs in a number of possible modes as a function of the frequency. For example, with a copper wire of 0.2 mm diameter, $\gamma = 2.8 \times 10^{-6}$ Kg/cm$^3$ and, when P=800 grams, the frequency F=840 Hz can be given for L=10 cm. For L=1 cm, F=8.4 kHz and for L=0.280 $\mu$m, F=30 kHz, for L=140 $\mu$m, F=60kHz, Thus, given a constant L a vibration of desired wavelength can be developed by varying the frequency which causes a proportional change of the node number.

It can accordingly be seen that a thinner workpiece, it is advantageous to provide a vibration of greater frequency or higher node number. Electrical machining discharges develop preferentially at anti-node or loop portions of the vibrating wire electrode. The increase of the node number thus results in an increase of the number of electrical machining discharges which are created. The increase in the node number also causes the decrease in the vibration amplitude which results in the reduction of the cutting clearance in the workpiece. Furthermore, it facilitates the removal of machining products from the gap region. The preferred range of the frequency of vibration is upwards of 1 kHz.

Figure 3:
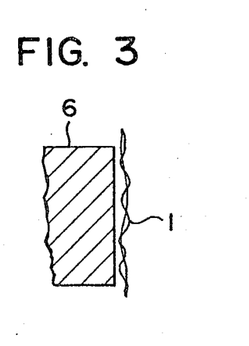
FIG. 3 is a schematic view diagrammatically illustrating a traveling electrode in which vibrations of different frequencies are developed and a workpiece being machined thereby.

In accordance with the present invention, vibrations are imparted to the traveling wire electrode by two separate vibrators and preferably at different frequencies. For example, the vibrator 10 is used to apply a vibration of frequency 30 kHz which develops a loop of 280 $\mu$m while the vibrator 11 is used to apply a vibration of 60 kHz which develops a loop of 140 $\mu$m. The two separate vibrations are superimposed upon one another to cause a beat or complex vibration as diagrammatically shown in FIG. 3. The two vibrators 10 and 11 are arranged, as shown in FIG. 2, to orient in the mutually orthogonal transverse directions along x and y-axes, respectively, so that highly complicated mechanical oscillations are developed in the traveling wire electrode 1. This has been found to markedly enhance the removal of machining chips, gases and other products generated between the wire electrode and the workpiece 6 and facilitate the contact of the removed machining liquid with these bodies, thereby effectively cooling the gap region. As a consequence, the constant stabilization of electrical machining discharges and the minimum development of arc discharges and short-circuiting are ensured with the result that there is less less tendency towards wire breakage and an increased removal rate obtained which amounts to twice the removal rate in the case in which no vibration is imparted to the wire electrode.

The frequency of vibration imparted at each separate location need not always be fixed but may be varied with time in response to the direction of the machining gap state and the vibration mode may also be varied in accordance with the workpiece material, thickness and/or shape.

Figure 4:
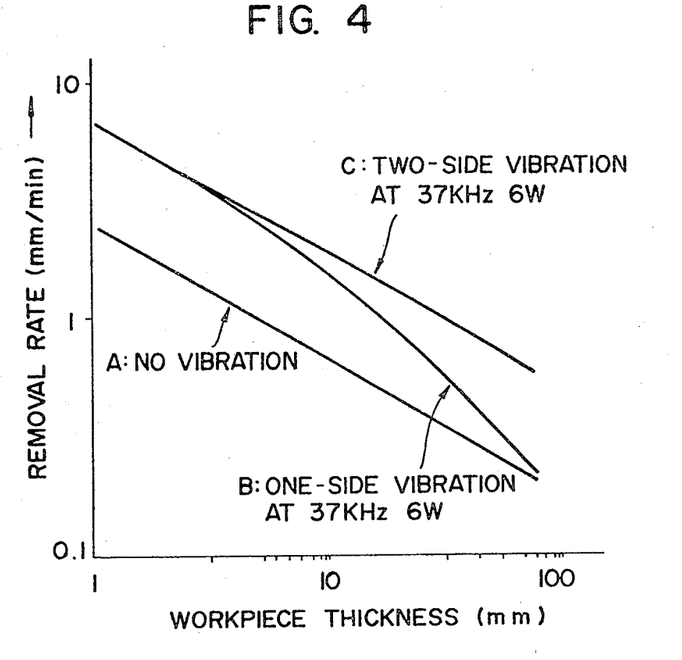
FIG. 4 is a graph comparing results of traveling-wire EDM operations in which no vibration is imparted to the wire and those using the wire vibration at a single and two locations.

In FIG. 4, there is shown a comparison of the removal rate versus the thickness of workpieces with various modes of operation, i.e. the mode A in which no vibration is applied to the wire electrode 1, the mode B in which vibration of a typical frequency, viz 37 kHz, is applied to the wire at one side or another with respect to the workpiece 6 and the mode C in which two vibrations of a frequency of 37 kHz are applied to the wire at two opposite sides with respect to the workpiece 6. It can be seen from the graph that vibrations can effectively be applied from the two opposite sides of a thicker workpiece to yield a removal rate which doubles the removal rate obtained in the case in which only single-side vibration is used.

Figure 5:
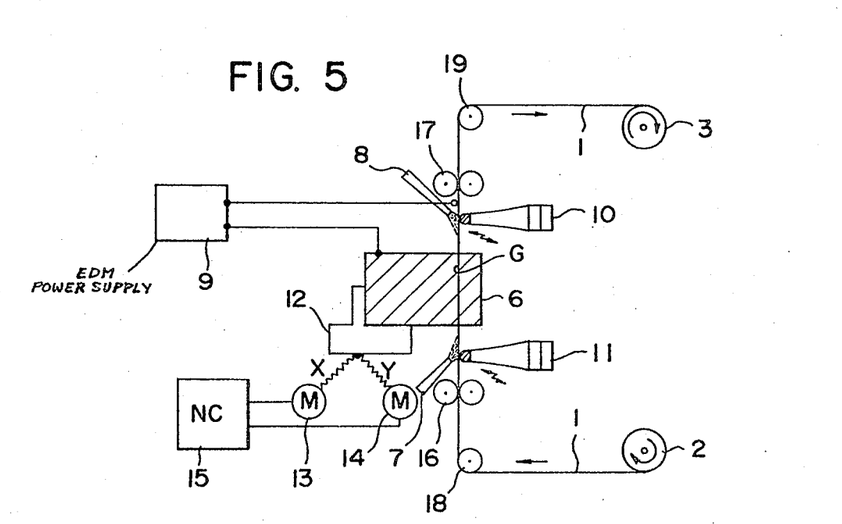
FIG. 5 is a schematic view essentially in section diagrammatically illustrating a modified traveling-wire EDM operation incorporating the present invention.

The traveling-wire EDM arrangement incorporating the present invention shown in FIG. 5 is essentially the same as that in FIG. 1 except that a work table 12 carrying the workpiece 6 and a drive system therefor are shown. The drive system includes a first motor 13, e.g. a stepping motor for displacing the work table 12 along the x-axis and a second motor 14, e.g. a stepping motor, for displacing the work table 12 along the y-axis, the motors 13 and 14 being driven by electrical signals furnished by a numerical controller 15 to displace the workpiece 6 relative to the traveling wire electrode 1 along a programmed cutting path. In addition, a pair of machining wire positioning guides 16 and 17 each comprising a pair of rollers are provided while rollers 18 and 19 serve to direct the continuous wire electrode 1 from the supply side 2 to the machining zone and from the latter to the takeup side 3, respectively.

The wire-vibrating method according to the present invention can apart from a usual wire-cut machining operation, be advantageously employed in a traveling-wire reforming or second-cut operation in which a workpiece rough-machine previously is subjected to a wire-cut operation to finish the machined surface with due precision and surface finish. The problem inherent in this operation is that it is extremely difficult to maintain a desired cutting depth precisely constant. In order to ensure this constancy, the wire electrode is, after a previous roughing operation, repositioned to slightly shift its cutting face interiorly or exteriorly. In the cutting operation, however, a force tending to force back the wire electrode away from the workpiece surface being cut develops at all times due to a pressure caused by the accompanying machining discharges and by decomposed gases expanding in the machining liquid in the gap region. This force causes the wire to bend backwardly and move away from the desired position so that the cutting depth may vary. This problem is overcome by applying the system of the present invention.

Figure 6:
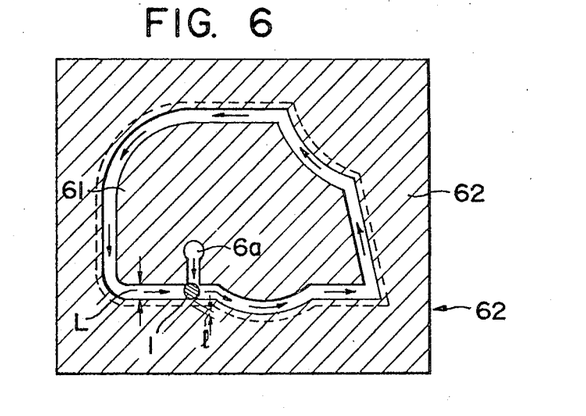
FIG. 6 is a plan view diagrammatically illustrating a workpiece machined previously and to be reformed or finished in accordance with the present invention.

Referring now to FIGS. 5 and 6, a traveling-wire EDM operation comprising roughing and finishing steps with the system of the present invention will be described. A workpiece 6 having a start hole 6a formed therethrough at a predetermined location by mechanical or EDM drilling is first set on the work table 7. The wire electrode 1 is passed through the hole 6a and the wire drive mechanism (not shown) is actuated to axially advance the wire electrode 1 in the direction of the arrows and transport it from the supply reel 2 onto the takeup reel 3 via guides 19 and 17, the hole 6a and guides 16 and 18 under a predetermined tension. A machining-liquid circulation unit (not shown) is operated to supply the machining liquid through nozzles 7 and 8 into the region of the workpiece 6 so that the machining gap G is flooded uniformly therewith. The EDM power supply 9 is turned on to apply a succession of electrical pulses across the gap between the traveling wire electrode 1 and the workpiece 6, thereby effecting successive machining discharges between them through the liquid medium to remove material from the workpiece.

A predetermined cutting path is programmed in advance in the numerical controller 15 whose output signals are applied to the drive motors 8 and 9 to displace the work table 12 so that the workpiece 6 carried thereby moves along the desired path relative to the traveling wire electrode 1. In the course of the cutting feed displacement as seen from FIG. 6, the wire electrode 1 moves relative to the workpiece, first advancing from the position of the pre-formed hole 6a in the workpiece 6 rectilineally along the minimum distance to a point on the desired cutting contour, then following the latter path as indicated by the arrows back to the said point. The cutting width or depth L formed during this contouring operation is defined by the sum of the diameter of the wire 1 and the gap G spacing and, when the wire 1 returns to the initial point, the core portion 61 of the machined workpiece 6 surrounded by the path is separated from the remainder thereof 62 surrounding the path and constituting the rough-machined workpiece.

After the above roughing step is accomplished, the machined workpiece 62 is formed with a further cut of a width or depth l by the succeeding finishing step. The width l is smaller than the previous cutting width L and the finishing step is performed at a faster cutting rate and desirably with a minimum amount of material removal to finish the previously machined contour and surface. The contouring feed applied during this finishing or reforming step by the numerical controller 15 to the workpiece is, as indicated by the broken line, an enlarged feed defined by the addition of the width l to the previous contouring path. In this finishing or reforming step, vibrations are advantageously applied to the traveling wire electrode 1 in accordance with the present invention.

Highly satisfactory results are obtained by imparting the vibrations to the traveling wire electrode 1 in directions transverse to the axis thereof so that a complex undulating motion develops in the wire 1 antinodes or loops thereof acting on the wall of the workpiece defining the machining gap. The orientations of vibrators 10 and 11 are therefore preferably controlled accordingly. As mentioned previously, the frequency of each separate vibration is not less than 100 Hz and, is preferably between 1 kHz and 500 kHz so that the composite undulating motion of the wire 1 has a high number of nodes and antinodes or loops. It is further preferable to change the positions of the nodes and antinodes or loops with time by periodically or aperiodically modifying the frequency of one or both of the two separate vibrators 10 and 11 to achieve a better result.

The use of vibrations allows the programmable secondary cutting width l to be reduced by an amount corresponding to the amplitude of vibrations which is between 1 and 5 $\mu$m and at most 10 $\mu$m. A desired finishing precision is therefore assured by adjusting the programmable path enlargement in conjunction with the vibrational amplitude to achieve a desired secondary cutting width. In some instances, the vibrating wire electrode 1 may simply follow the previous rough-contouring path with the vibrational amplitude giving the desired secondary cutting width l.

The use of vibrations facilitates the removal of machining chips, gases and other products from the gap during the finishing or reforming step and minimizes disturbances caused thereby against the machining stability. In addition, the tendency toward wire bending due to the discharge pressure and gaseous expansion pressure within the machining gap mentioned previously is advantageously eliminated or alleviated. The wire electrode 1 forcibly vibrated acts to counter the explosion of decomposed gases and the discharge pressure and thereby to maintain the small machining gap spacing precisely constant to allow the axis of the wire 1 to follow the programmed cutting path precisely and without deviation. The finishing accuracy is thus markedly improved over that of the existing systems and a highly qualified finish surface results.

Figure 7:
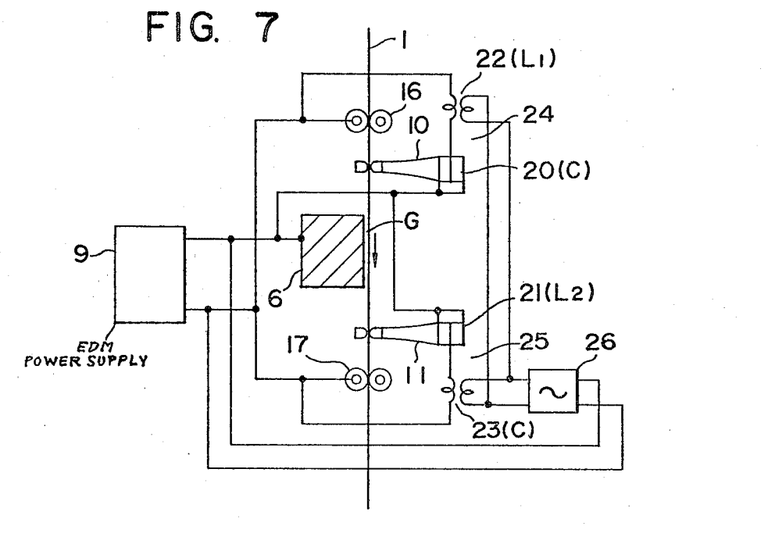
FIG. 7 is a schematic view diagrammatically illustrating a power-supply circuit system for vibrators according to the invention.

In FIG. 7 there is shown a further embodiment of the present invention in which each of the vibrators for imparting separate vibrations to the traveling wire electrode is energized by a resonant circuit connected with the machining gap. Thus, the two vibrators 10 and 11 include the respective electromechanical transducers 20 and 21 which are each constituted by a quartz, Roschelle salt, barium titanate, cobalt steel or the like piezoelectric or magnetostrictive element. The transducers 20 and 21, so constituted, provide a capacitance C1, C2 and are connected via inductors 22 and 23, respectively, with the machining gap to form the respective series resonant circuits 24 and 25. The inductances L1 and L2 of the inductors 22 and 23 are adjusted at suitable values in conjunction with the capacitance C or capacitances of the transducers 22 and 23 to establish desired resonant conditions in the circuits 24 and 25.

A high-frequency power supply 26 is coupled with inductors 23 and 24 for applying an external high-frequency energy to the resonant systems 24 and 25. The resonant frequencies in the circuits 24 and 25 and hence of the output of the source 26 are set typically in the range between 10 and 200 kHz and sometimes as low as 100 Hz.

In the machining operation, machining pulses are applied from the EDM power supply 9 to provide successive electrical discharges across the machining gap G. The resonant circuits 24 and 25 constituted by the capacitances $C_1$ and $C_2$ of the transducers 20 and 21 and inductances L1 and L2 of the inductors 22 and 23, are then brought into oscillating resonant conditions with electrical discharges passing through the machining gap G to induce at the end of vibrator, horns 10 and 11 intensified high-frequency vibrations which are applied to the traveling wire electrode 1. The amplitude of vibration is, as mentioned hereinbefore, in the range preferably between 1 and 3 μm which insures a due machining precision while permitting gap discharges to develop dispersively and with stability along the wire electrode 1 traveling through the machining gap G with a minimum occurrence of arc discharges or short-circuiting current flows.

The use of oscillatory resonant circuits 24 and 25 as has been described presents advantages over the external power supply system previously shown. Since the circuits 24 and 25 operate into resonance with vibratory parameters of machining discharges in the gap and provide variable oscillating conditions in accordance with change in discharge energy in the gap, an optimization of their vibration modes and the resulting effects on the machining conditions is achieved to allow machining to continuingly proceed with stability and a markedly improved removal rate is attained. Further, an improvement in removal rate and machining efficiency also results from the superimposition of the resonant energy furnished by the resonant circuits 24 and 25 upon the source energy furnished by the external supply 26 to cause the transducers 20 and 21 to vibrate with stability and with an increased effect of imparting vibrations to the traveling wire electrode 1.

Figure 8:
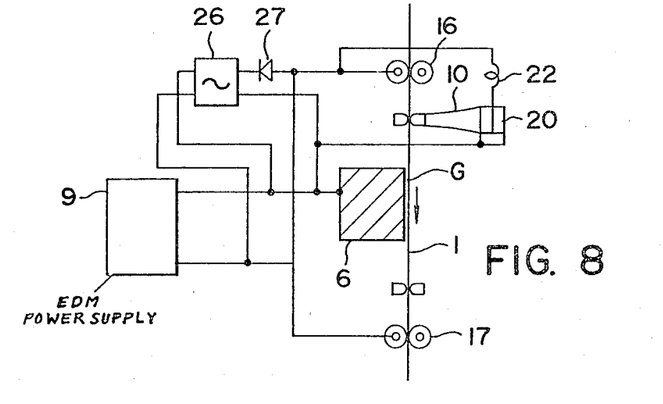
FIG. 8 is a similar view illustrating a modification of the system of FIG. 7.

In a modified system shown in FIG. 8, the high-frequency external power supply 26 is connected across the machining gap G in parallel with the transducer 20 and the inductor 22 and a rectifier 27 is connected in series with the supply 26 and the gap G to make the workpiece poled positive and the wire electrode poled negative. In this embodiment as well, improvements in in removal rate and machining efficiency essentially identical to those in the preceding embodiment result.

I claim:

1. A method of electroerosion-machining an electrically conductive workpiece with a wire electrode which is stretched to extend along a straight line path across the workpiece while being axially transported from a supply site to a collection site to axially travel through the workpiece continuously along said path, said method comprising the steps of:

relatively displacing said wire electrode and said workpiece transversely to the axis of said traveling wire electrode while defining a machining gap therebetween;

supplying a machining liquid to said gap;

applying a series of electrical pulses between said workpiece and said electrode to generate machining discharges across the gap, thereby removing material from said workpiece; and imparting a vibration of a frequency not lower than 100 Hz to said traveling wire electrode at each of two locations arranged respectively on the two opposite sides of said workpiece and in a direction transverse to the axis of said traveling wire electrode whereby the two vibrations are superimposed upon one another and result in a composite undulating oscillatory motion of said traveling wire electrode with more than two nodes and antinodes or loops of the motion along said axis in the path.

2. The method defined in claim 1 wherein the two vibrations imparted to said traveling wire electrode at said two locations respectively are of different frequencies.

3. The method defined in claim 2 wherein said workpiece and said traveling wire electrode are relatively displaced along mutually orthogonal x- and y-axes and one of said vibrations is applied to said traveling wire electrode at one of said locations in the direction of said x-axis while the other vibration is applied to the traveling wire electrode at the other location in the direction of said y-axis.

4. The method defined in claim 2 wherein each of said two vibrations has a frequency of at least 1 kHz.

5. The method defined in claim 4 wherein said frequency is in the range between 1 and 50 kHz.

6. The method defined in claim 4 wherein said composite undulating oscillatory motion has an amplitude in the range between 1 and 50 microns.

7. The method defined in claim 6 wherein said amplitude is in the range between 1 and 5 microns.

8. The method defined in claim 2 wherein said wire electrode is stretched between a first and second wire guide member disposed on said two sides, respectively, and said two locations are in the vicinity of said first and second wire guide members, respectively.

9. The method defined in claim 1 wherein said workpiece is a workpiece with a contour previously machined in a roughing step by electroerosion machining with a wire electrode.

10. An apparatus for electroerosion-machining an electrically conductive workpiece with a wire electrode which is stretched to extend along a straight line path across the workpiece while being axially transported from a supply means to a collection means to axially travel through the workpiece continuously along said path, the apparatus comprising:
  means for relatively displacing said traveling wire electrode and said workpiece transversely to the axis of said traveling wire electrode while defining a machining gap therebetween;
  means for supplying a machining liquid to said gap;
  means for applying a series of electrical pulses between said workpiece and said electrode to generate machining discharges across the gap, thereby removing material from said workpiece;
  first means disposed at a first location on one side of said workpiece for imparting a first vibration of a frequency not lower than 100 Hz to said traveling wire electrode on said one side; and
  second vibrator means disposed at a second location on the other side of said workpiece for imparting a second vibration of a frequency not lower than 100 Hz to said traveling wire electrode on said other side,
  said first and second vibrator means being arranged to apply to said traveling wire electrode said two vibrations which are superimposed upon one another and result in a composite undulating oscillatory motion of said traveling wire electrode with more than two nodes and antinodes or loops of the motion along said axis in the path.

11. An apparatus as defined in claim 10 wherein said displacing means includes a work table for carrying said workpiece, first drive means for displacing said work table along an x-axis and second drive means for displacing said work table along a y-axis orthogonal to said x-axis, said apparatus further comprising first support means for orienting said first vibrator means so as to impart said first vibration to said traveling wire electrode in the direction of said x-axis on said one side and second support means for orienting said second vibrator means so as to impart said second vibration to said traveling wire electrode in the direction of said y-axis on said other side.

12. The apparatus defined in claim 10 wherein said first and second vibrator means are arranged each in contact with said wire electrode.

13. The apparatus defined in claim 10 wherein said first and second vibrator means are arranged each in close proximity to said wire electrode.

14. The apparatus defined in claim 10 wherein said first and second vibrator means each comprises an electromagnetic or a sonic or ultrasonic vibrator.

15. The apparatus defined in claim 10 wherein said first and second vibrator means each comprises a magnetostrictive or piezoelectric element.

16. The apparatus defined in claim 15 wherein said element has a capacitance, said vibrator means comprising an energization circuit therefor including an inductor having a preselected inductance adapted to form, with said capacitance, a resonant circuit connected with said machining gap.

17. The apparatus defined in claim 16 wherein said element and said inductor are connected in series across said machining gap.

18. The apparatus defined in claim 16 wherein said element and said inductor are connected in parallel across said machining gap.

19. The apparatus defined in claim 16, 17 or 18, further comprising an external power supply having an output winding coupled with said inductor.

20. The apparatus defined in claim 16, 17 or 18 further comprising an external power supply connected in series with said resonant circuit and said machining gap.

21. The apparatus defined in claim 10 wherein said first and second vibrator means are adapted to produce said first and second vibrations at different frequencies.

* * * * *